(12) United States Patent
Bonko et al.

(10) Patent No.: US 6,260,594 B1
(45) Date of Patent: Jul. 17, 2001

(54) INDUSTRIAL SERVICE PNEUMATIC TIRE

(75) Inventors: Mark Leonard Bonko, Uniontown; Timothy Michael Rooney, Munroe Falls, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/463,852

(22) PCT Filed: Dec. 15, 1997

(86) PCT No.: PCT/US97/22840

§ 371 Date: Jan. 24, 2000

§ 102(e) Date: Jan. 24, 2000

(87) PCT Pub. No.: WO99/15348

PCT Pub. Date: Apr. 1, 1999

Related U.S. Application Data

(63) Continuation-in-part of application No. 09/076,758, filed on Sep. 22, 1997, now Pat. No. Des. 402,245.

(51) Int. Cl.[7] .......................... B60C 11/11; B60C 107/02; B60C 121/00
(52) U.S. Cl. .................................. 152/209.1; 152/209.12; 152/209.21; 152/209.28
(58) Field of Search ............................ 152/209.1, 209.12, 152/209.21, 209.28; D12/149, 150, 151

(56) References Cited

U.S. PATENT DOCUMENTS

| | | | |
|---|---|---|---|
| D. 104,503 | 5/1937 | Partenheimer . | |
| D. 312,064 | 11/1990 | Duncan | 12/151 |
| D. 388,844 | * 1/1998 | Bonko . | |
| D. 402,245 | 12/1998 | Bonko et al. | 12/149 |
| 4,176,703 | * 12/1979 | Nojima et al. . | |
| 4,217,943 | * 8/1980 | Tsuzura . | |
| 4,446,902 | 5/1984 | Madec et al. | 152/209 |
| 4,480,672 | 11/1984 | Marshall et al. | 152/209 B |
| 4,481,993 | 11/1984 | Ohnishi | 152/209 B |
| 5,002,110 | 3/1991 | Tsurunaga et al. | 152/209 |
| 5,078,190 | 1/1992 | Wissbrock et al. | 152/209 |

FOREIGN PATENT DOCUMENTS

| | | |
|---|---|---|
| 888654 | * 9/1953 | (DE) . |
| 0442427 | 8/1991 | (EP) . |
| 61-249806 | * 11/1986 | (JP) . |
| 3-31009 | * 2/1991 | (JP) . |
| 5-178025 | * 7/1993 | (JP) . |
| 7-1903 | * 1/1995 | (JP) . |
| 1771996 | * 10/1992 | (SU) . |

OTHER PUBLICATIONS

Alliance 308 Super Traction Tire, 1996 Tread Design Guide, p. 167, Feb. 1996.
Armstrong/Titan Loader–Dozer Tire, 1996 Tread Design Guide, p. 167, Feb. 1996.
Dico HD2000 Tire, 1996 Tread Design Guide, p. 170, Feb. 1996.
General LD Loader Grader Tire, 1996 Tread Design Guide, p. 174, Feb. 1996.
Patent Abstracts of Japan, vol. 011, No. 102 (M–576), Mar. 31, 1987 & JP 61 249806A (Bridgestone Corp), Nov. 7, 1986.

* cited by examiner

*Primary Examiner*—Steven D. Maki
(74) *Attorney, Agent, or Firm*—David L. King

(57) ABSTRACT

A pneumatic tire (20) for small construction type vehicle has a leading edge projection (47, 67) extending from the lugs (40, 60) to provide a wear pad and pivot position for improved ride and durability performance.

7 Claims, 4 Drawing Sheets

INDUSTRIAL SERVICE PNEUMATIC TIRE

This application is a continuation-in-part of application Ser. No. 29/076,758 filed Sep. 22, 1997 now U.S. Pat. No. Des. 402,245.

TECHNICAL FIELD

A pneumatic tire for small construction type vehicles such a skid steer vehicle and loader back hoe vehicles has a tread pattern designed for improved wear and reduced vibration.

BACKGROUND ART

Construction vehicles work in a variety of service conditions exposing the tires to loose soft wet clay and mud, paved roads, gravel and to broken concrete, glass and debris at demolition sites. These conditions result in rapid wearing of the treads for such tires.

A particularly difficult application for the tire is when mounted on skid steer vehicles. These vehicles provide turning capability by braking or locking one side of the vehicle's tires while driving the opposite side of the vehicle tires, thus the name skid steer. The tires actually skid to perform a turning maneuver over the terrain conditions stated above. Rapid wearing of tread results as a direct result of this scuffing action. The prior art tread pattern 10 shown in FIG. 1 and as taught in U.S. Pat. No. 4,481,993 is particularly prone to this rapid wearing.

At the leading edge 5 of the lugs 6,8 at the location of the intersection 3 of the inclined shoulder portion 2 and the lateral portion 4 this wear induced by turning is most apparent. The tread 10 is supported by the lateral portions 4 of lugs 6 and 8 when turning right or left and as the tire turns and rotates the maximum resistance to the tuning moment M as illustrated occurs at locations 3. On hard paved surfaces this location abrades rapidly. In broken debris and concrete the location 3 can be chipped and chunked away.

A second phenomenon detrimental to good tire performance results in the unsupported nature of the vehicle load as the tire groove 7 enters the footprint. As can be readily seen, the unsupported region is very large and shifts from left to right as the tire 10 rotates. This results in increased vibration and a non-uniform loading of the underlying tire carcass which in turn transmits these vibrations through the wheel back to the vehicle and the operator.

The resultant transmission of this vibration is bad under straight line driving but becomes worse under rapid turning maneuvers. The operator can actually transmit steering inputs, which can cause the tire carcass to be twisted, and contorted resulting in a vibration transmission commonly referred to as "tire hop." Those skilled in the art have attempted solutions of stiffening and shortening the tire sidewalls which can lessen these vibrations. This solution, however, requires the vehicle owner to replace all his rims and accept a tire with less air damping volume resulting in a stiffer less comfortable overall ride. Due to the stiffer carcass structure an even more rapid wearing of the tread lugs is expected when such a design is employed.

The tire of the present invention provides a tread pattern specifically designed to improve treadwear, reduce vibration and minimize the phenomena of "tire hopping."

DISCLOSURE OF INVENTION

Summary of the Invention

A pneumatic tire 20 for a small construction type vehicle has a nominal rim diameter of 762 mm (30 inches) or less, an aspect ratio of less than 70%, and an annular tread 32.

The tread 32 has a plurality of lugs 40,60 projecting radially outwardly from the tread 32, an equatorial plane EP dividing the tread into a first tread half 32A and a second tread half 32B, the equatorial plane EP being perpendicular to the axis of rotation of the tire 20.

The plurality of tread lugs 40,60 is divided into a first row 40 and second row 60 of lugs. Each lug 40,60 extends from a first or second tread half. The lugs 40,60 each have an inclined axially outer portion 46,66 and a laterally extending axially inner portion 44,64. The axially inner portion 44,64 cross the equatorial plane and extend into an opposite tread half. Each axially inner portion 44,64 of a lug within a first or second row 40,60 is located between a pair of axially inner portions 44,64 of lugs from an opposite row with the axially inner portions 44,64 of circumferentially adjacent lugs of opposite rows being substantially parallel and spaced a circumferential distance D from an adjacent lug 40,60.

Each lug 40,60 has a leading edge projection 47,67. The leading edge projection 47,67 is located at the junction of the axially inner portion 44,64 and the inclined axially outer portion 46,66 along a leading edge 41,61 of each lug 40,60. Each projection 47,67 extends circumferentially a distance of about 50%, preferably at least 50% into the spaced distance D between the adjacent lugs 40,60.

Preferably the projection 47,67 is axially located such that the axially inner end 45,65 of a lug from a first or second row 40,60 is substantially axially aligned with a portion of the leading edge projection 47,67 of a circumferentially adjacent lug of the opposite row.

In the preferred embodiment a line 70 tangent to the leading edge 41,61 of the axially inner portion 44,64 of a lug if extended to intersect the leading edge 41,61 of the axially outer portion 46,66 would exhibit a radially outer surface area A defining the leading edge projection. Preferably the surface area A is substantially trapezoidal in shape having a circumferential length of at least 10 mm, a long base of greater than 25 mm and a short base of greater than 12 mm for a 12–16.5 NHS size or greater, smaller sizes being proportionately smaller.

The tread 32 most preferably has a net-to-gross ratio as measured around the entire circumference of the tread of about 50% or less.

Definitions

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about a 25–65° angle with respect to the equatorial plane of the tire, the ply cords running at opposite angles in alternate layers.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction.

"Design Rim" means a rim having a specified configuration and width. For the purposes of this specification, the design rim and design rim width are as specified by the industry standards in effect in the location in which the tire is made. For example, in the United States, the design rims are as specified by the Tire and Rim Association. In Europe, the rims are as specified in the European Tire and Rim Technical Organization--Standards Manual and the term design rim means the same as the standard measurement rims. In Japan, the standard organization is The Japan Automobile Tire Manufacturer's Association.

"Design Rim Width" is the specific commercially available rim width assigned to each tire size and typically is between 75% and 90% of the specific tire's section width.

"Equatorial Plane (EP)" means the plane perpendicular to the tire's axis of rotation and passing trough the center of its tread.

"Footprint" means the contact patch or area of contact of the tire tread with a flat surface at zero speed and under normal load and pressure.

"Inner" means toward the inside of the tire and "outer" means toward its exterior.

"Lateral Edge" means the axially outermost edge of the tread as defined by a plane parallel to the equatorial plane and intersecting the outer ends of the axially outermost traction lugs at the radial height of the inner tread surface.

"Leading" refers to a portion or part of the tread that contacts the ground first, with respect to a series of such parts or portions, during rotation of the tire in the direction of travel.

"Net-to-gross Ratio" means the ratio of the surface area of the normally loaded and normally inflated tire tread rubber that makes contact with a hard flat surface, divided by the total area of the tread, including noncontacting portions such as grooves as measured around the entire circumference of the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Radial" and "radially" mean directions radially toward or away from the axis of rotation of the tire.

"Radial Ply Tire" means a belted or circumferentially-restricted pneumatic tire in which the ply cords which extend from bead to bead are laid at cord angles between 65° and 90° with respect to the equatorial plane of the tire.

"Section Height" (SH) means the radial distance from the nominal rim diameter to the outer diameter of the tire at its equatorial plane.

"Section Width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Tire Design Load" is the base or reference load assigned to a tire at a specific inflation pressure and service condition; other load-pressure relationships applicable to the tire are based upon that base or reference.

"Trailing" refers to a portion or part of the tread that contacts the ground last, with Sect to a series of such parts or portions during rotation of the tire in the direction of travel.

"Tread Arc Width" (TAW) means the width of an arc having its center located on the plane (EP) and which substantially coincides with the radially outermost surfaces of the various traction elements (lugs, blocks, buttons, ribs, etc.) across the lateral or axial width of the tread portions of a tire when the tire is mounted upon its designated rim and inflated to its specified inflation pressure but not subject to any load.

"Tread Width" means the arc length of the tread surface in the axial direction, that is, in a plane parallel to the axis of rotation of the tire.

"Unit Tread Pressure" means the radial load borne per unit area (square centimeter or square inch) of the tread surface when that area is in the footprint of the normally inflated and normally loaded tire.

BRIEF DESCRIPTION OF DRAWINGS

The following is a brief description of the drawings in which like parts bear like reference numerals and in which.

DETAILED DESCRIPTION OF THE INVENTION

Figure 4:
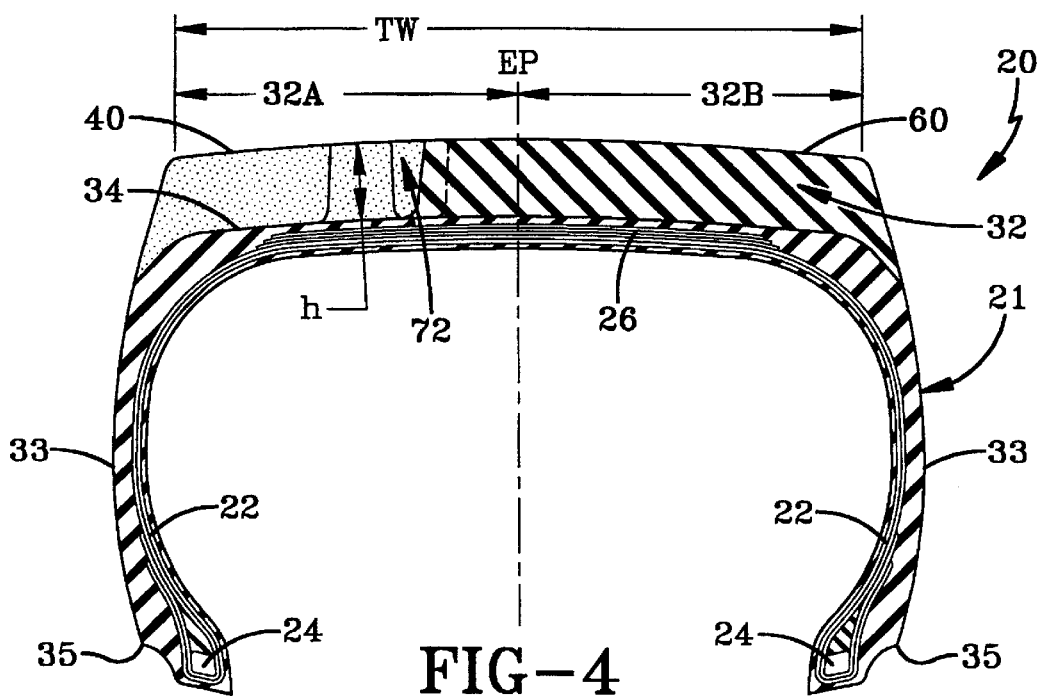
FIG. 4 is a cross-sectional view of the tire according to the invention.

Now referring to FIG. 4 a tire is shown in cross-sectional view generally as reference numeral 20. The tire has a casing 21 having one or more carcass plies 22 extending circumferentially about the axis rotation of the tire. As illustrated the tire preferably has 3 to 4 cord reinforced plies having synthetic nylon or polyester cords. The carcass plies are anchored around a pair of substantially inextensible annular beads 24. A belt or breaker reinforcing member 26 can be used that has one or more belt plies disposed radially outward from the carcass plies. If used, preferably four belts are employed. The belts being of a polyester, nylon or ammid cord reinforcement alternatively the cords can be of an ultra high tensile monofilament steel cord reinforcement. These belt plies provide reinforcement for the crown region of the tire 20. A circumferentially extending tread 32 is located radially outwardly of the belt reinforcing structure 26.

A sidewall portion 33 extends radially inwardly from each axial or lateral tread edge 33A,33B of the tread to an annular bead portion 35 having the beads 24 located therein. Carcass plies 22 preferably have the cords oriented radially. The number of plies depends on the load carrying requirements of the tire. The figures illustrate the preferred tread pattern made in a directional fashion.

Figure 2:
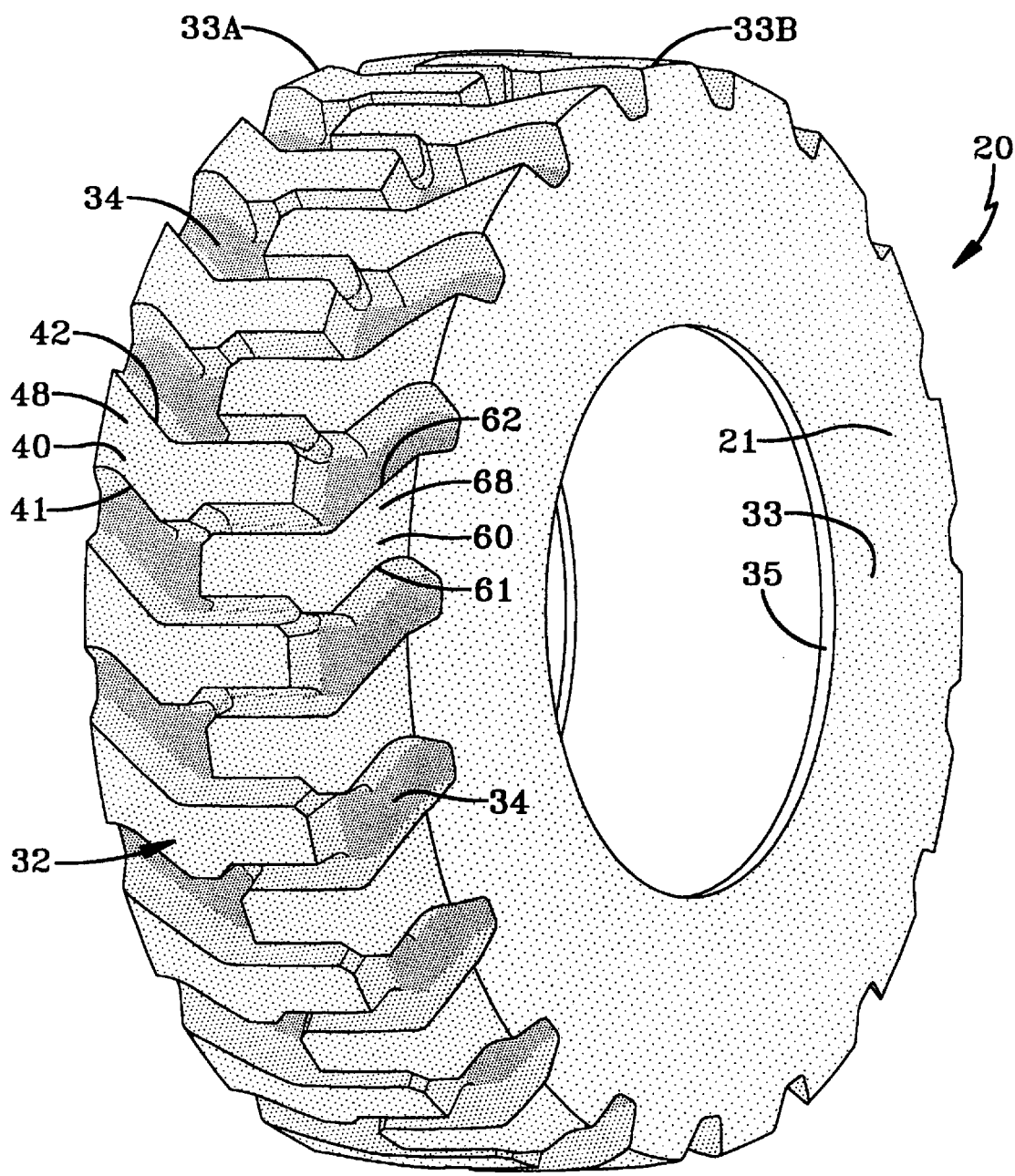
FIG. 2 is a perspective view of a tire according to the invention.
Figure 3:
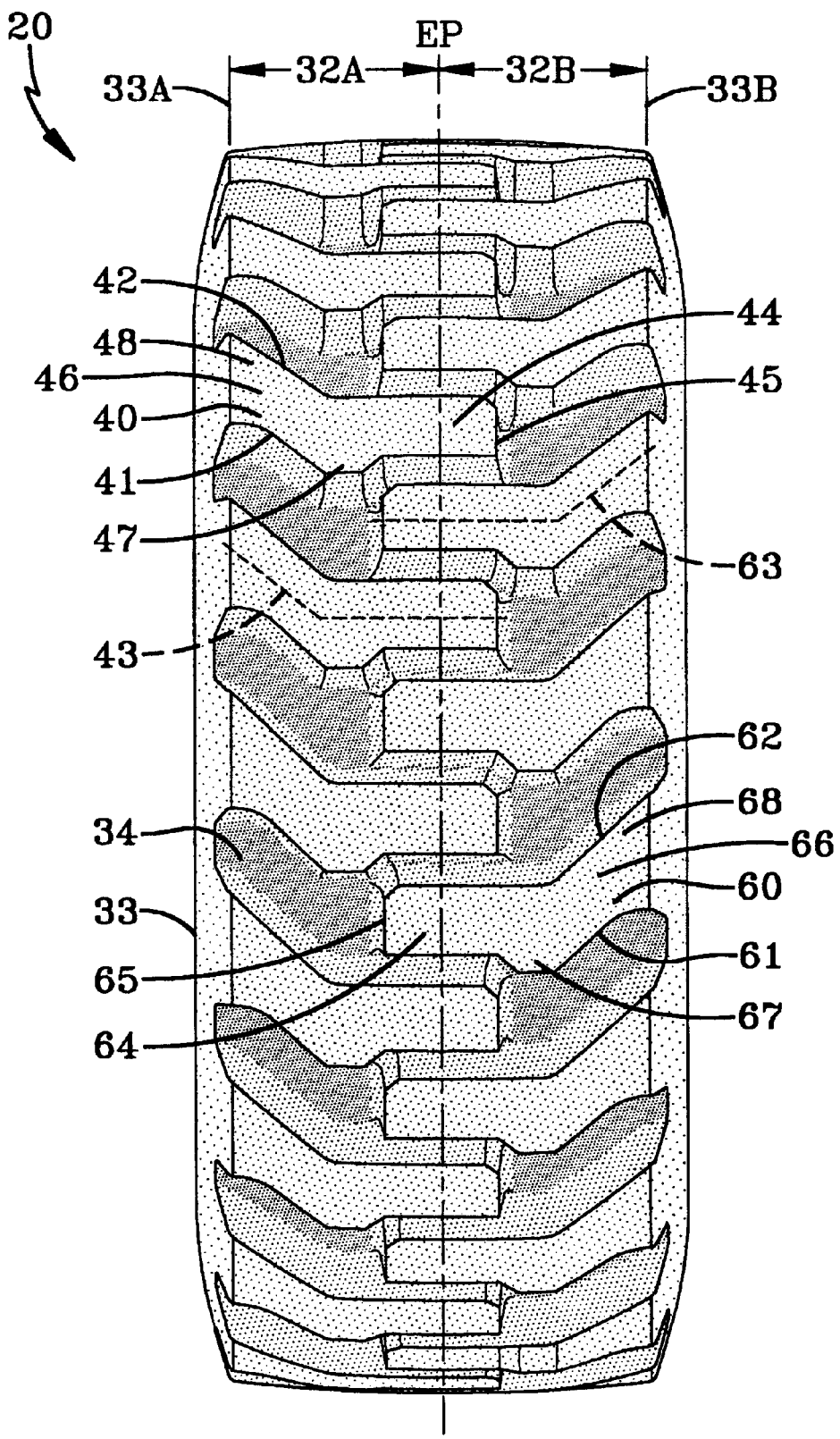
FIG. 3 is a plan view of the tire according to the invention of FIG. 2.

Now referring to FIG. 2, the tire 20 according to the present invention, is illustrated in a perspective view. The tire 20 according to the present invention as a unique directional tread 32. The tread 32 has a first tread edge 33A and a second tread edge 33B. Disposed between the tread edges 33A and 33B is an inner tread 34 and a plurality of lugs 40 and 60 extending radially outwardly from the inner tread 34. As illustrated in FIG. 2 each lug 40,60 has a radially outer surface 48,68, a leading first edge 41 and 61, a trailing second edge 42,62. The lugs 40 all are in a first row while the lugs 60 all are in a second row.

Figure 5:
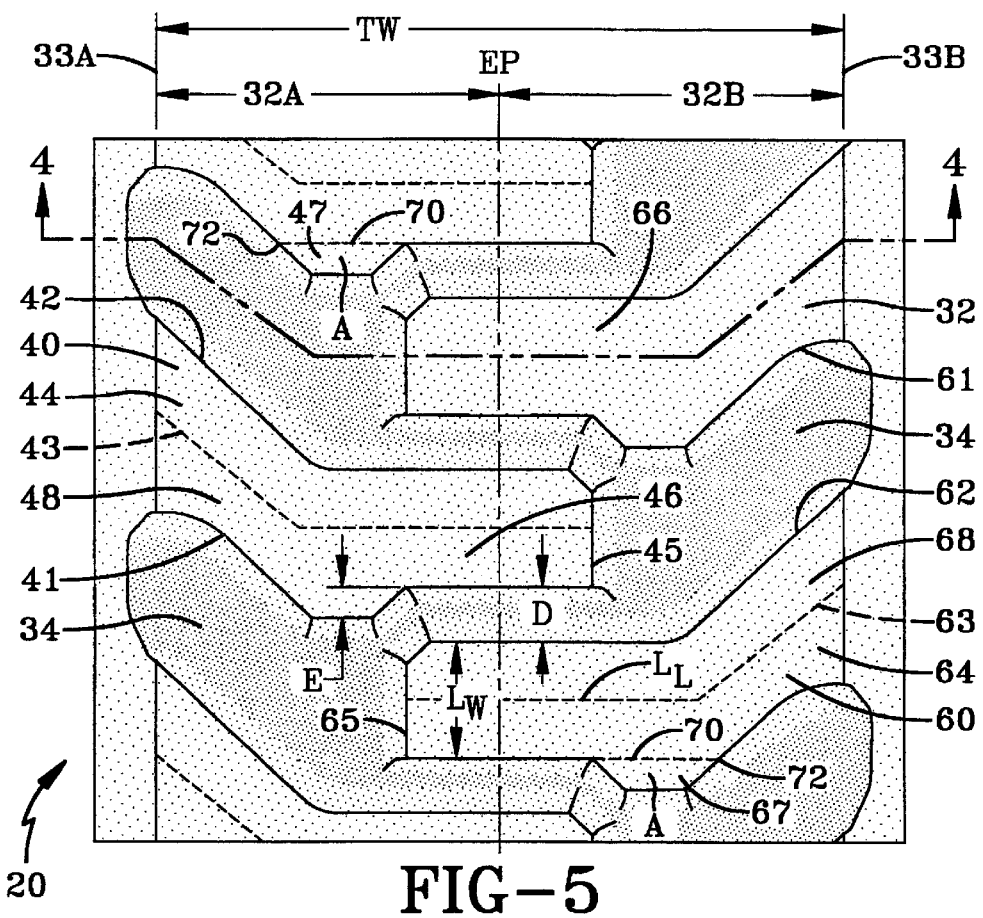
FIG. 5 is an enlarged fragmentary plan view of the tread pattern of the tire according to the invention.

As shown in FIG. 5, the average distance along the center line 43,63 between the leading and axially inner ends 45,65 and axially outer end defines the total lug length $L_L$ of the lugs 40,60, with the axially inner ends 45,65 being located across the equatorial plane at about 60% of the tread width. The length $L_L$ is at least 75% of the tread width TW, preferably about 100%.

The distance extending substantially perpendicularly between the leading and trailing edges 41,42 and 61,62 of the lug 40,60 define the average lug width (Lw). The radial distance extending between the inner tread 34 and the tread edges 41,42 and 61,62 of the lug 60 defines the radial lug height h. At the equatorial plane of the tire 20 the lug height preferably is an R-4 type lug height as specified by the Tire & Rim Industry standard for industrial service applications.

Both the lugs 40 and the lugs 60 are of similar shape but are oriented opposite in hand.

As shown in FIG. 5, each lug 40 or 60 has a laterally extending axially inner portion 44,64 and an inclined axially outer portion 46,66. If the leading edge 41,61 along the laterally extending axially inner portion is extended as shown along the tangency line 70 to intersect the leading edge 41,61 along the inclined axially outer portion 46,66 at point 72, then the area A as shown defines a leading edge projection 47,67 of each lug. As shown the leading edge projestons 47,67 have a substantially trapezoidal area A.

As shown the distance D between the axially inner portions 44 and 64 defines the groove width at the equatorial plane between adjacent lugs 40,60.

Figure 1:
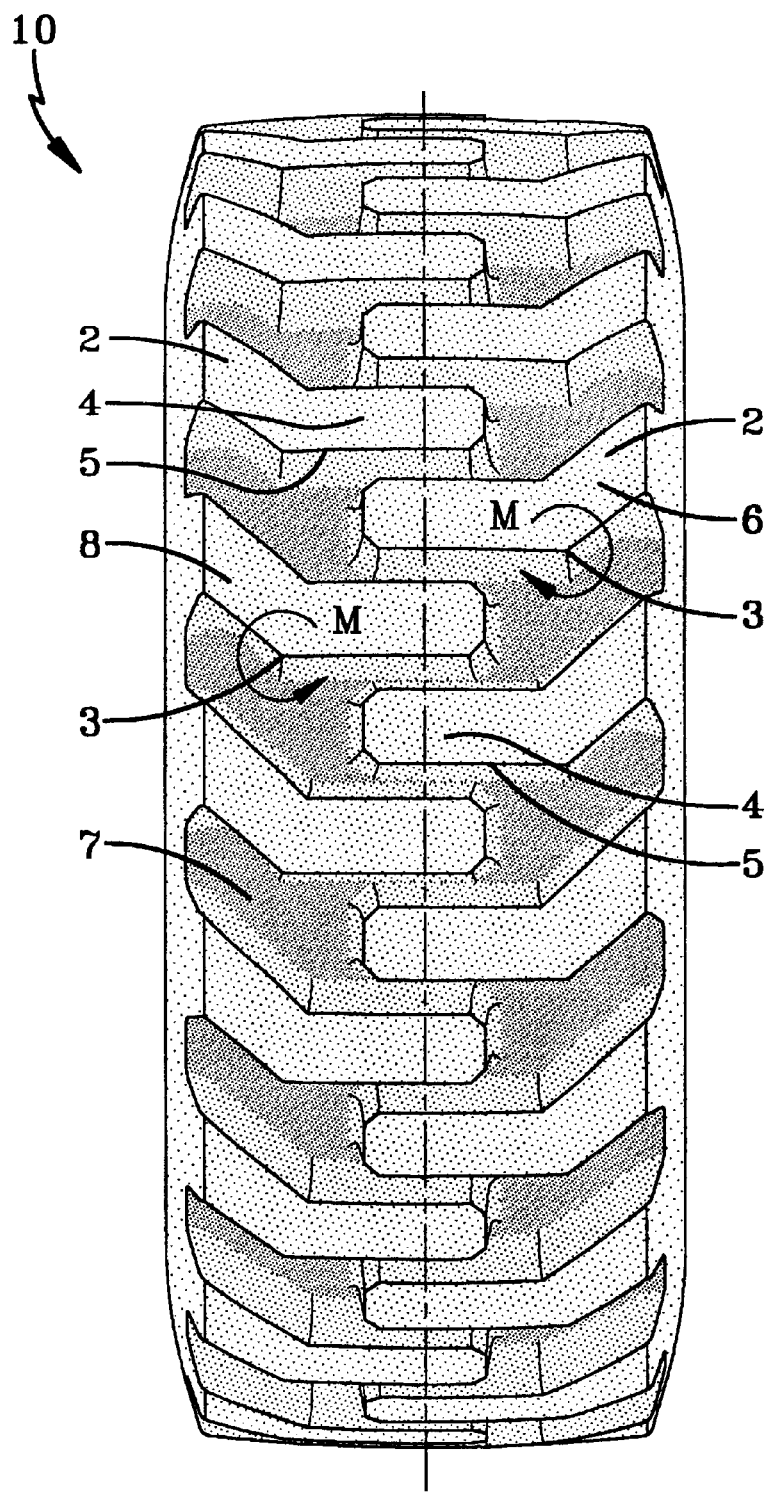
FIG. 1 is a plan view of a portion of a prior art tire 10.

The projections 47,67 extend circumferentially a distance E about 50%, preferably at least 50% of the distance D. These projection 47,67 on both sides of the tread halves 32A,32B provide additional contact points on the tread 32 as it rotates through the contact patch. It effectively reduces the gaps shown in the prior art tread of FIG. 1 in half. This greatly improves the ride and handling performance of the tire by reducing the lug impact harmonic peak amplitudes.

As shown the projections 47,67 are located at a critical wear point. It is recommended that the shape of the projection be trapezoidal with the long base being at least 25 mm in length while the height of the trapezoid is at least 10 mm while the length of the short base is at least 12 mm . These dimensions provide a very stable shape for enhanced wear while still being sufficiently small to let the tread lugs penetrate the soil when off-road traction is required.

Alternatively, these projections are ideally shaped to provide a pivot point for the tread when placed in a turning maneuver. This features greatly reduces the power hop phenomena without requiring a dramatic stiffening of the sidewall or a change in rim diameters as has been suggested.

As can be seen from the above description a great improvement in wear and ride can be accomplished without a loss in the beneficial traction and general shape of the tire.

What is claimed is:

1. A pneumatic tire for small construction vehicles, the tire having a nominal rim diameter of 762 mm (30 inches) or less, an aspect ratio of less than 70%, an annular tread having a plurality of lugs projecting radially outwardly, an equatorial plane dividing the tread into a first and second tread half, the equatorial plane being perpendicular to the axis of rotation of the tire, the plurality of tread lugs being divided into a first row and a second row, each lug extending from a first or a second tread half, the lugs having an inclined axially outer portion and a laterally extending axially inner portion, the axially inner portion crossing the equatorial plane and extending into an opposite tread half, and each lug of a row being located between a pair of lugs from an opposite row, the axially inner portions of circumferentially adjacent lugs of opposite rows being substantially parallel and spaced a circumferential distance D, the tire being characterized by:

each lug having a leading edge projection, the leading edge projection being at a junction of the axially inner portion and axially outer portion along a leading edge of each lug, each projection extending circumferentially a distance at least 50% of the spaced distance D between the adjacent lugs.

2. The tire of claim 1 wherein the axis inner end of the axially inner portion of a lug of a first row or second row is substantially axially aligned with a portion of the leading edge projection of a circumferentially adjacent lug of the opposite row.

3. The tire of claim 1 wherein the leading edge of the lug along the inclined axially outer portion and the leading edge of the lug along the lateral axially inner portion if extended to intersect the leading edge of the axially outer portion would exhibit a radially outer surface area A defining the leading edge projection.

4. The tire of claim 3 wherein the surface area A is substantially trapezoidal.

5. The tire of claim 3 wherein the surface area A has a circumferential length of at least 10 mm.

6. The tire of clam 3 wherein the 4 wherein the surface area A has a long base of greater than 25 mm and a short base of greater than 12 mm.

7. The tire of claim 1 wherein the tread has a net-to-gross ratio as measured around the entire circumference of the tread of about 50% or less.

\* \* \* \* \*